C. C. FARMER.
FLUID PRESSURE BRAKE DEVICE.
APPLICATION FILED JAN. 21, 1921.
1,432,450.  Patented Oct. 17, 1922.
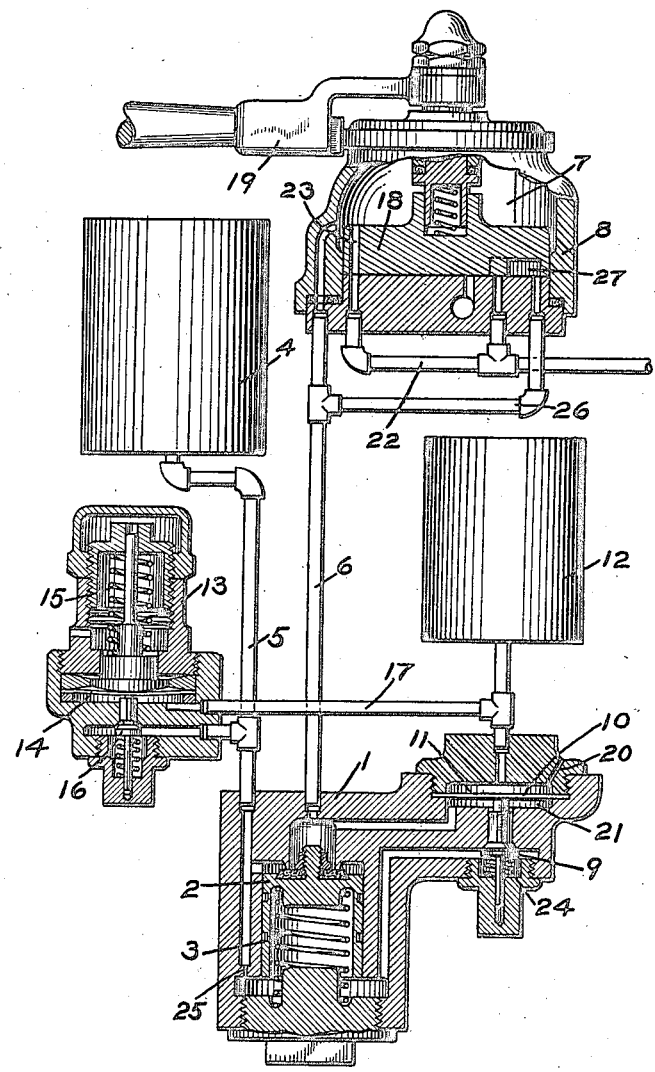
INVENTOR
CLYDE C. FARMER
BY *Wm. M. Cady*
ATTORNEY Patented Oct. 17, 1922.

1,432,450

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE-BRAKE DEVICE.

Application filed January 21, 1921. Serial No. 438,884.

*To all whom it may concern:*

Be it known that I, CLYDE C. FARMER, a citizen of the United States, residing at Edgewood, in the county of Allegheny and State of Pennsylvania, have invented new and useful Improvements in Fluid-Pressure-Brake Devices, of which the following is a specification.

This invention relates to fluid pressure brakes, and more particularly to means for controlling and regulating the supply of fluid to the brake pipe in effecting the recharge of the brake pipe and the release of the brakes.

With the present standard fluid pressure brake system, the brake valve device is usually provided with a full release position, in which fluid is supplied at full main reservoir pressure to the brake pipe, and a running position, in which fluid is supplied to the brake pipe at the pressure carried in the brake pipe as determined by a feed valve device.

The full release position is provided so that the engineer may supply fluid under pressure to the brake pipe at a pressure in excess of the normal pressure carried in the brake pipe, in order to ensure the prompt and positive release movement of the triple valves throughout the train, but if the brake valve handle is left in full release position for too long a time, there is danger that the brake pipe will become overcharged and consequently the auxiliary reservoirs, particularly at the head end of the train, so that as the pressure in the brake pipe returns to normal the brakes will reapply when not intended.

One object of my invention is to provide means for rapidly charging the brake pipe in releasing the brakes, in which the danger of overcharging the brake pipe is obviated.

Another object of my invention is to provide an improved feed valve device for regulating the supply of fluid under pressure to the brake pipe.

In the accompanying drawing, the single figure is a sectional diagrammatic view of a construction embodying my invention.

According to my invention, fluid is supplied to the brake pipe through the brake valve device in full release position by the operation of a feed valve device which prevents the flow of fluid to the brake pipe in excess of the normal pressure carried in the brake pipe, the feed valve device being so constructed, however, that a very rapid flow is provided, in order to ensure the prompt movement of the triple valves throughout the train to release position.

The feed valve device may comprise a casing 1 containing a valve piston 2, subject on one side to the pressure of a spring 3 and adapted to control communication from the main reservoir 4 through a pipe 5 to a pipe 6 which communicates with the rotary valve chamber 7 of the brake valve device 8.

The operation of the valve piston 2 is controlled by a valve 9 and a diaphragm 10 having the chamber 11 at one side connected to a reservoir 12.

The pressure in the reservoir 12 is maintained at a predetermined constant pressure by means of a regulating portion 13 comprising a casing containing a diaphragm 14, subject on one side to the pressure of an adjustable spring 15 and adapted to operate a valve 16 for controlling the admission of fluid from the main reservoir 4 to a pipe 17 leading to the reservoir 12.

The brake valve device 8 may be of the usual type comprising a casing having a valve chamber 7 containing a rotary slide valve 18 adapted to be operated by handle 19.

In operation, the regulating spring 15 of the regulating portion 13 being adjusted for the pressure which is to be carried in the brake pipe, the valve 16 is opened by the pressure of the spring 15 on the diaphragm 14 when the pressure in the reservoir 12 is less than the predetermined pressure for which the spring is adjusted.

In order to prevent overcharging of the reservoir 12 by possible leakage past the valve 16, a restricted port 20 to the atmosphere is connected to the chamber 11.

The chamber 21 at the opposite side of the diaphragm 10 is connected to the pipe 6 and therefore the rotary valve chamber 7 of the brake valve.

In full release position of the brake valve, as shown in the drawing, the brake pipe 22 is connected by a port 23 through the rotary valve 18 with the valve chamber 7, and if the brake pipe pressure is less than the standard pressure carried, the higher pressure in chamber 11 will overcome the reduced brake pipe pressure in chamber 21, so that diaphragm 10 is operated to open the valve 9 and vent fluid from the spring side of valve piston 2 to the pipe 6. The main reservoir pressure which acts on the area of the valve piston 2 outside its seat, then moves the valve piston so as to open communication from the main reservoir to the pipe 6.

A large opening is thus provided for rapidly supplying fluid to the brake pipe in full release position, but the pressure in the brake pipe is prevented from rising above the standard pressure, since the increase in brake pipe pressure to normal will act in chamber 21 to balance the standard pressure in chamber 11, so that the diaphragm will permit the valve 9 to be closed by the spring 24.

As soon as the valve 9 closes, the pressure on the spring side of the valve piston 2 is immediately built up to main reservoir pressure by flow through a restricted port 25, so that the valve piston 2 is promptly closed by spring 3, to cut off the further flow of air from the main reservoir to the brake pipe.

The feed valve construction herein described may also be employed for maintaining the brake pipe pressure in the running position of the brake valve, thus dispensing with the usual feed valve device.

For this purpose, a branch pipe 26 from the pipe 6 leads to the seat of the rotary valve 18 and is adapted, in the running position of the brake valve, to be connected through a cavity 27 with the brake pipe 22.

Having now described my invention, what I claim as new and desire to secure by Letters Patent, is:—

1. In a fluid pressure brake, the combination with a brake pipe and a brake valve device having a full release position in which fluid is supplied to the brake pipe, of a feed valve device for limiting the maximum pressure of fluid supplied to the brake pipe and provided with means for delivering fluid at a rate corresponding with the degree of pressure existing in the brake pipe.

2. In a fluid pressure brake, the combination with a brake valve device having a full release and a running position, of a single feed valve device for regulating the supply of fluid to the brake valve device in said positions.

3. In a fluid pressure brake, the combination with a brake pipe, main reservoir, and brake valve device having a full release and a running position in which fluid under pressure is supplied to the brake pipe, of a single feed valve device for limiting the pressure of fluid supplied through the brake valve device to the brake pipe to a degree less than main reservoir pressure.

4. In a fluid pressure brake, the combination with a brake valve device, of a feed valve device for controlling the supply of fluid under pressure to said brake valve device comprising a fluid pressure supply portion, a valve for varying the pressure on said supply portion for operating same, a diaphragm for operating said valve, a reservoir connected to one side of said diaphragm, and means for maintaining the pressure in said reservoir at a predetermined degree.

5. In a fluid pressure brake, the combination with a brake valve device, of a feed valve device for controlling the supply of fluid under pressure to said brake valve device, comprising valve means for supplying fluid to the brake valve device, a reservoir, a diaphragm subject to the opposing pressures of the reservoir and the pressure of fluid supplied to the brake valve device, a valve operated by said diaphragm for varying the pressure on said valve means, and means for maintaining the pressure in said reservoir at a predetermined degree.

In testimony whereof I have hereunto set my hand.

CLYDE C. FARMER.